(No Model.)

F. H. RICHARDS.
WEIGHING MACHINE.

No. 572,088. Patented Nov. 24, 1896.

Witnesses:
Chas. D. King.
Fred. J. Dole.

Inventor:
F. H. Richards.

(No Model.) 6 Sheets—Sheet 3.

F. H. RICHARDS.
WEIGHING MACHINE.

No. 572,088. Patented Nov. 24, 1896.

Witnesses:
Chas. D. King
Fred. J. Dole

Inventor:
F. H. Richards (No Model.)　　　　　　　　　　　　　　　　　　　　　　　　6 Sheets—Sheet 4.
F. H. RICHARDS.
WEIGHING MACHINE.

No. 572,088.　　　　　　　　　　　　　　　Patented Nov. 24, 1896.

Witnesses:
Chas. D. King.
Fred. J. Dole.

Inventor:
F. H. Richards.

(No Model.)　　　　　F. H. RICHARDS.　　　6 Sheets—Sheet 5.
WEIGHING MACHINE.

No. 572,088.　　　　　　　　Patented Nov. 24, 1896.

Witnesses:　　　　　　　　　　　　　　Inventor:
Chas. D. King.
Fred. J. Dole.　　　　　　　　　　　　F. H. Richards.

UNITED STATES PATENT OFFICE.

FRANCIS H. RICHARDS, OF HARTFORD, CONNECTICUT.

WEIGHING-MACHINE.

SPECIFICATION forming part of Letters Patent No. 572,088, dated November 24, 1896.

Application filed May 7, 1896. Serial No. 590,584. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing apparatus, and more especially to stream feed or supply mechanism therefor, an object being to provide improved means of this character embodying a variable-speed feeder or feed device and efficient means for changing its speed from one velocity to another and for also stopping its movement at predetermined points in the operation of the apparatus, so that the stream of material supplied thereby may be varied in volume in correspondence with the variation in speed of the feeder and may be also stopped therewith.

Another object is to provide improved means for operating the driving mechanism of the feeder and for controlling the same from a suitable reciprocatory member of the weighing mechanism.

Figure 1:
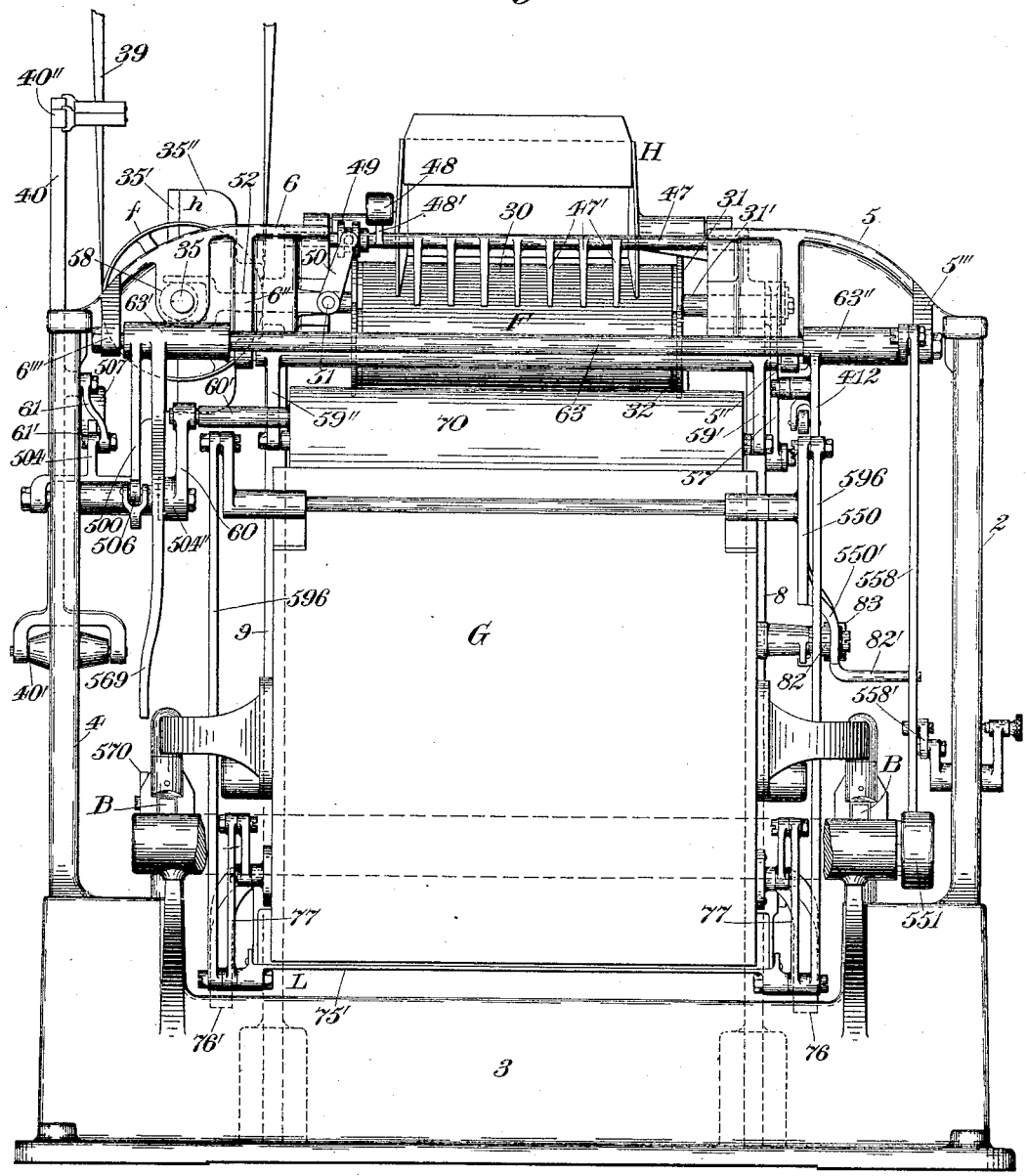
Figure 2:
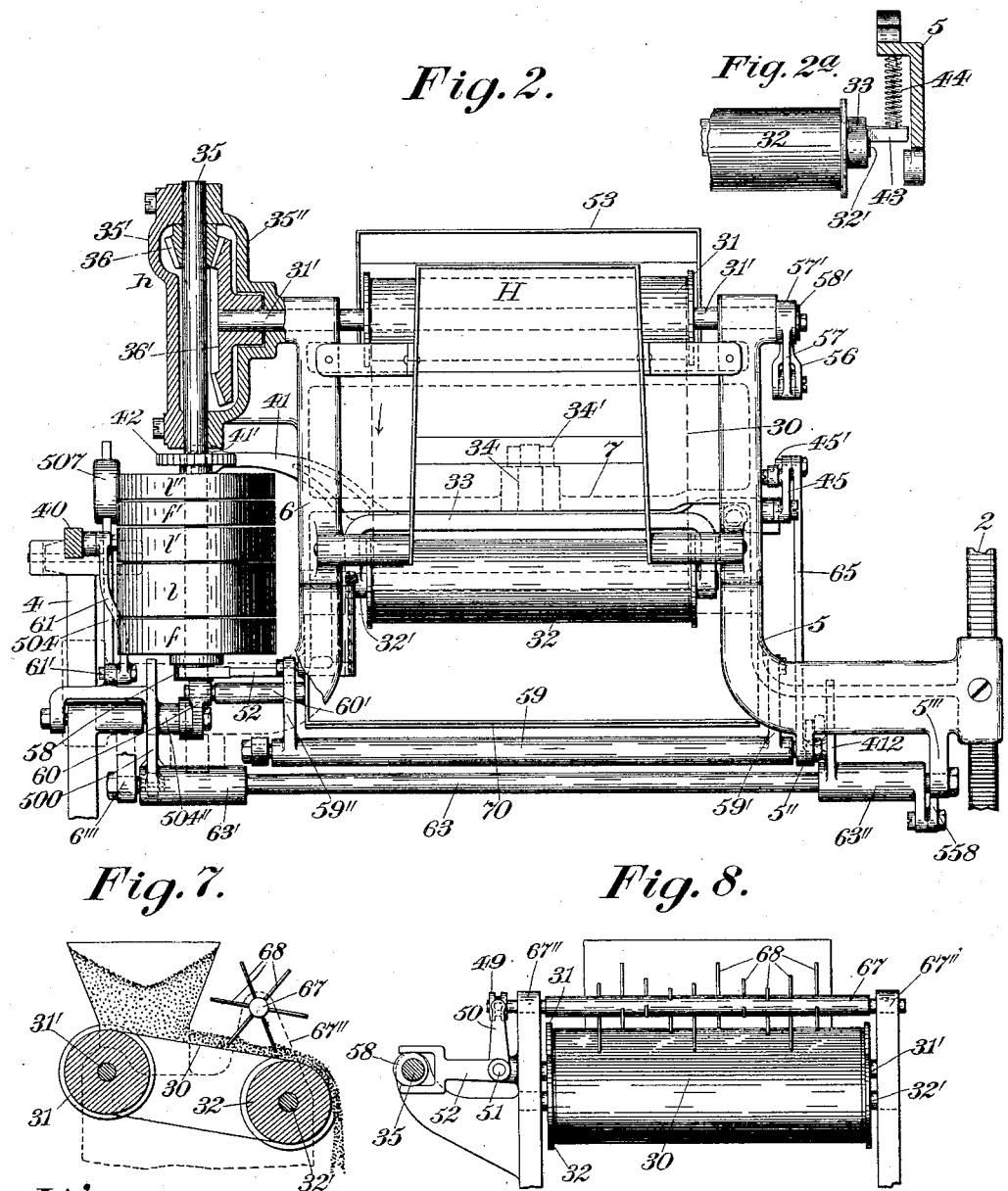
Figure 3:
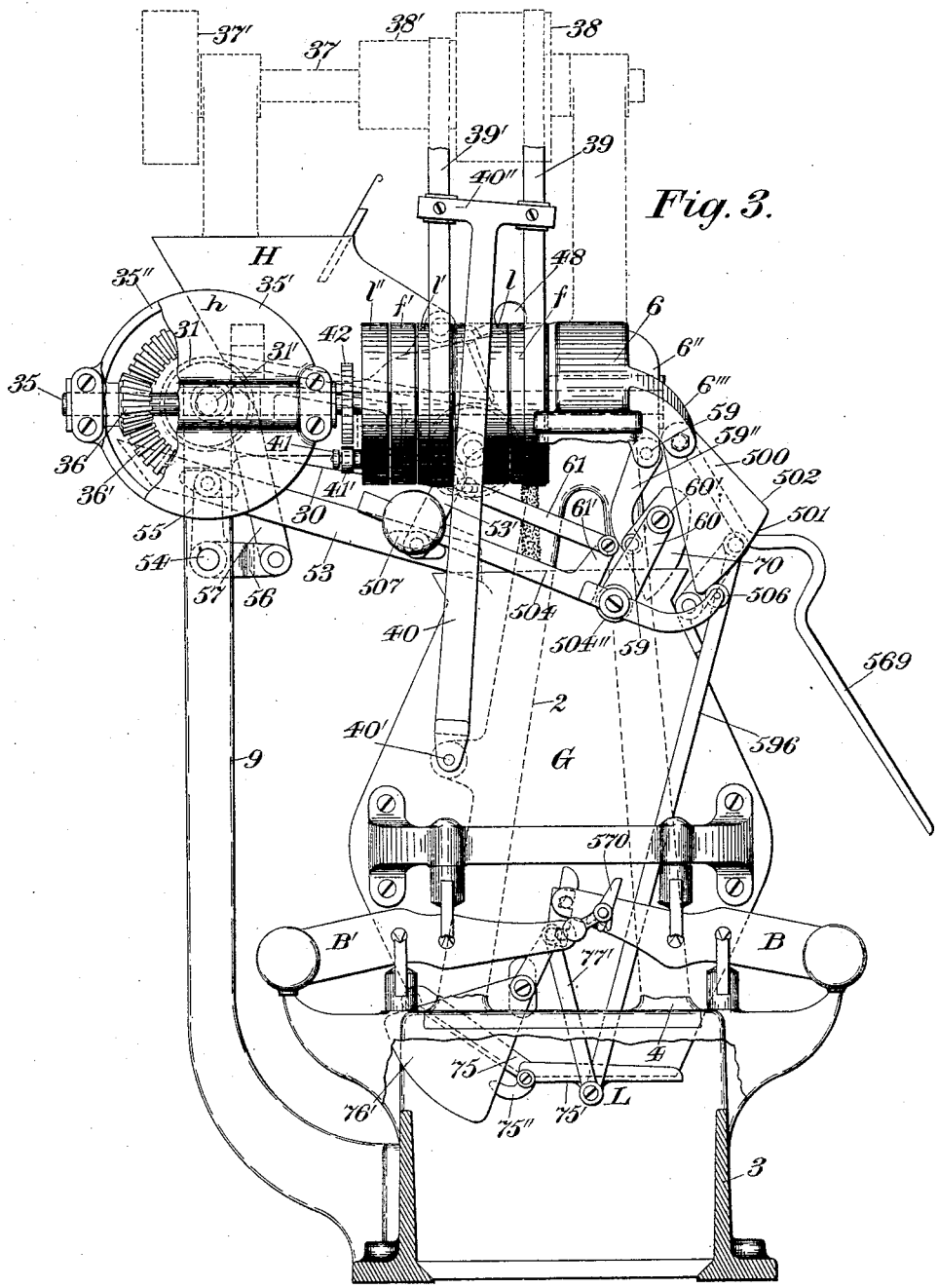
Figure 4:
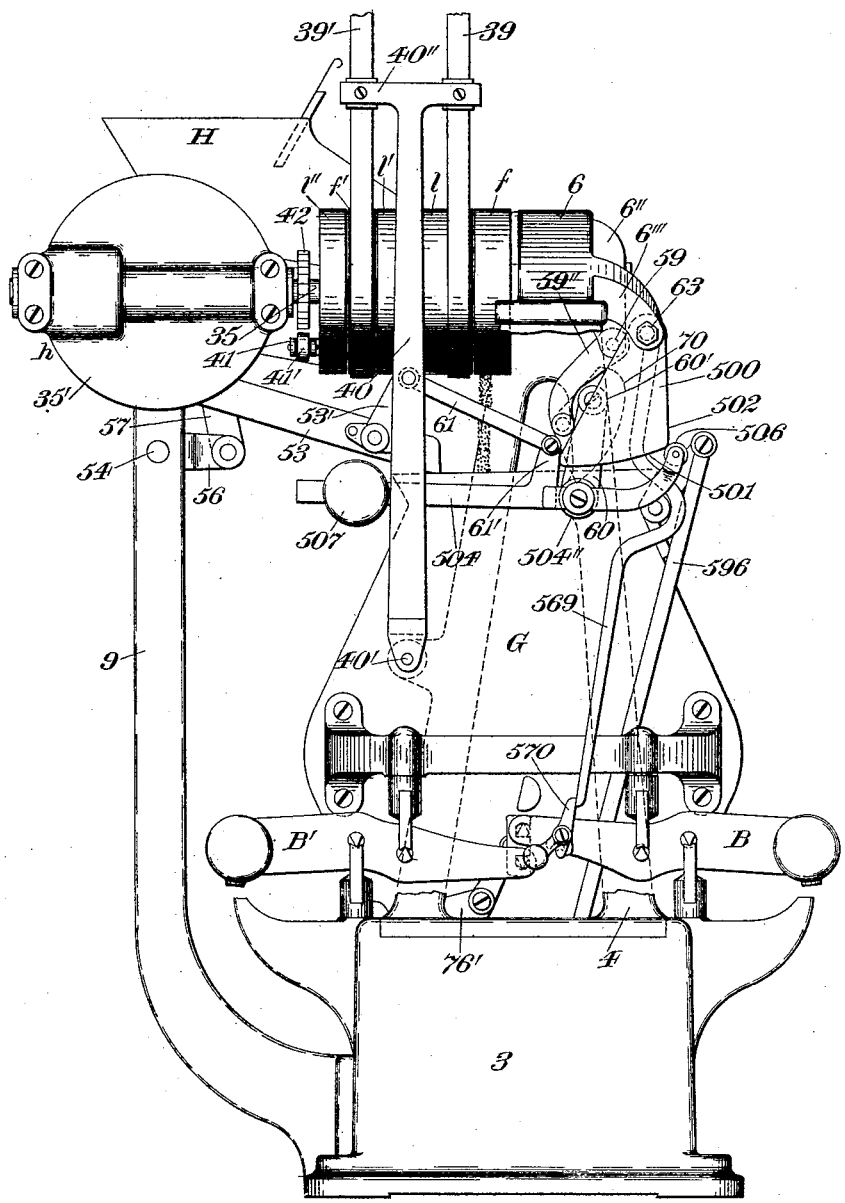
Figure 5:
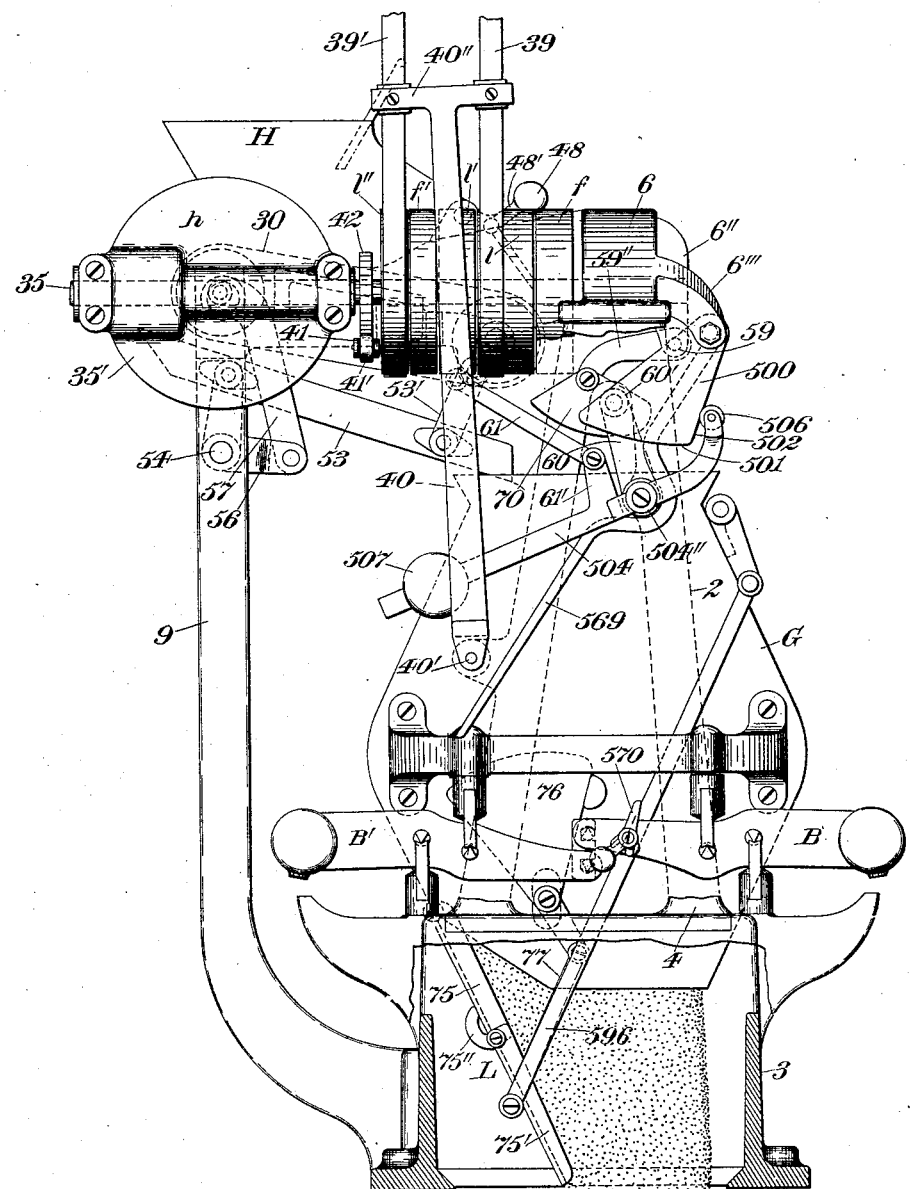
Figure 6:
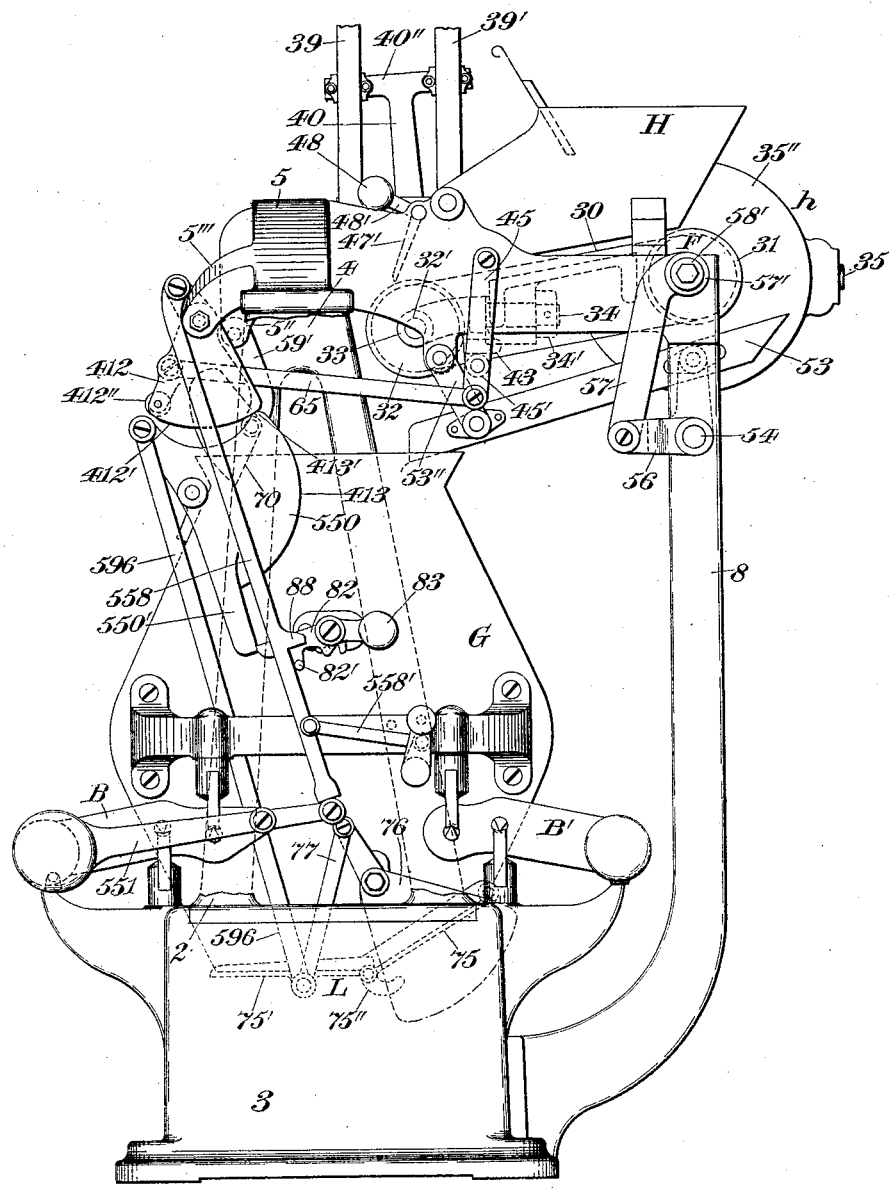

In the drawings accompanying and forming part of this specification, Figure 1 is a front elevation of a weighing apparatus comprehending my present improvements in the preferred embodiment thereof and illustrating the positions occupied by the various operative mechanisms and devices at the commencement of operation, the feeding mechanism being driven at its high velocity. Fig. 2 is a plan view of the upper part of the apparatus, a portion of the feeder-mechanism-driving means being shown in central horizontal section. Fig. 2ª is a detail in sectional elevation of part of the feeder-vibrating means. Figs. 3, 4, and 5 are end elevations as seen from the left in Fig. 1, showing the positions assumed by the operative parts of the apparatus when the feeding mechanism is driven at its high and low speeds, respectively, and when at rest, the bucket or load-carrying receptacle being shown discharging its contents in said last-mentioned view or when the feeder is at rest. Fig. 6 is an end elevation as seen from the opposite side of the apparatus or from the right in Fig. 1, the operative parts being in positions corresponding, respectively, with Figs. 1 and 3. Fig. 7 is a central vertical section of a modified form of supply-disintegrating device, and Fig. 8 is a front elevation of the same.

Similar characters designate like parts in all the figures of the drawings.

My present invention comprises as one of its constituent elements a weighing mechanism which may be of any suitable or preferred kind; but for convenience in illustrating the nature and peculiar purposes of said invention I have shown and will hereinafter describe weighing mechanism of the type disclosed in Letters Patent No. 548,840, granted to me on October 29, 1895, to which reference may be had.

The framework for supporting the operative parts of the weighing mechanism may be of any suitable character and is herein illustrated comprising the two side frames or members 2 and 4, respectively, which are mounted upon the chambered supporting-base 3, into which latter the bucket-loads of material from the weighing mechanism are intermittently discharged.

Two beams 5 and 6 are shown connected, respectively, with the side frames 2 and 4, said beams being joined by the preferably integral tie-plate 7, the structure constituting a convenient framing for supporting certain of the working parts of the feeding mechanism. As a means for increasing the stability of this top framing, the two supports or standards 8 and 9, extending upwardly from opposite ends of the base 3 and connected to the two beams 5 and 6, are shown.

The beam mechanism is herein illustrated comprising the oppositely-disposed scale-beams B and B', respectively, preferably and suitably mounted upon the chambered supporting-base 3 and comprising suitable means for supporting the bucket, which latter is designated in a general way by G.

The closer for the bucket is designated in a general way by L and is shown comprising the two connected plates or sections 75 and 75', the connection between these members being illustrated as a pivotal one, and the plate 75 being also illustrated as pivotally connected near the lower rearward side of the bucket G and adjacent to one side of the discharge outlet or orifice, which, it will be observed, is of considerable size or area, so that the bucket contents may be discharged with great rapidity.

As a means for sustaining the bucket-closer L, the following-described mechanism may be employed: The bucket G is illustrated pivotally carrying near the upper rearward side thereof the rocker 550, which constitutes one member of a closer-supporting toggle. The other member of said toggle is shown as the connecting-rod 596, which is pivotally connected to the rocker and to the closer L (see Fig. 6) in such a manner that when the closer is in its normal or shut position the two pivots of said connecting-rod or toggle member 596 will be substantially in alinement with and the upper of said pivots will be above the rocker-pivot, so that the rocker, and hence the connected closer, may be held against movement by a latch or like device with a minimum pressure thereon, as practically the entire weight of the bucket contents will be supported from the rocker-pivot. For thus holding the rocker 550 against oscillatory movement on the bucket G when the closer is in its normal position the latch 82 is herein illustrated and is shown pivotally supported upon the bucket G, being preferably provided with a detent for engaging a coöperating detent on one end of the rocker-arm 550'. In the embodiment illustrated the closer-latch 82 swings upward for engaging the rocker 550, it being suitably counterweighted, as at 83, for effecting this movement. For releasing the closer L it will be apparent that the latch 82 is depressible, and when its detent is disengaged from the coöperating detent of the rocker 550 the closer is freed of all restraint and may be forced open by the weight of the bucket contents to thereby cause a discharge thereof.

As a means for returning the closer to its normal position when the bucket-discharged mass has passed below the discharge edge or lip of the said closer, the end walls of the bucket G are shown pivotally supporting the two counterweighted levers 76 and 76', respectively, which are connected by means of the links 77 and 77' with the bucket-closer L and to the section 75' thereof. The operation of these connected parts will be readily obvious from an inspection of the drawings. When the closer L is locked in its closed position, the said counterweighted plates will be in the position illustrated in Figs. 3 and 6. On the release of the closer in the manner previously described the weight of the bucket contents forces the closer open and simultaneously therewith moves the counterweighted portions of the two levers 76 and 76' upward to the position indicated in Fig. 5 and against suitable stops, which prevent further opening movement of said closer. When the mass has passed below the closer L, the counterweights of the levers 76 on resuming their normal position are effective for shutting the closer through the medium of the described connections.

When the closer L is in its normal position, as indicated in Fig. 3, it will be noticed that the two plates 75 and 75' are disposed in different planes, and on the opening movement the two sections will be shifted into alinement, so as to practically form a unitary structure, and a suitable stop or stops will be preferably employed for preventing a movement beyond such position of one of said plates. The plate 75' is illustrated equipped with a stop or stops 75'', which impinge against the under surface of the plate 75 when the closer L has reached the limit of its opening movement.

The invention contemplates the provision of feeding mechanism for supplying or forcing a stream of material into the bucket or load-carrying receptacle of the weighing mechanism, which action is necessary in the case of materials possessing certain characteristics—such as flour, cotton-seed meal, &c.—which cannot be successfully supplied to the bucket by gravity, as when the stream-controlling valve or valves employed in the ordinary classes of machines have reached a predetermined point in their closing movements such substances cannot flow over the valve, such valves being disposed at such an inclination as will prevent such action.

The feeding mechanism herein illustrated comprises a feeder or feeding device which is designated in a general way by F and is shown consisting of an endless band or apron 30 of suitable material—such as canvas or leather—which is shown supported by the two rolls 31 and 32, the first-mentioned of which is preferably operatively connected with suitable driving or actuating mechanism for effecting a movement of the feeder, the direction of which is indicated by the arrow in Fig. 2. The opposite ends of the shaft 31' of the roll 31 are shown journaled in suitable bearings formed in the top frame or beams 5 and 6 of the apparatus, said shaft being extended beyond said beams for a purpose to be hereinafter described. The opposite ends of the shaft 32' are shown journaled in suitable bearings formed in the opposite members of the yoke 33.

The yoke 33 is illustrated pivotally supported for rocking or vibratory movement, the peculiar purpose of which will hereinafter appear, and as having the rearward-projecting spindle or pivot 34 journaled in a suitable bearing formed approximately midway of the plate 7.

Means are also shown for preventing the displacement of the feeder-roll 32, which consists, in the present instance, of the nut 34', threaded on the spindle 34, by removing which said roll 32 may be readily removed.

A supply chute or hopper is shown at H and is of ordinary construction, being suitably secured to the two beams 5 and 6, and being also located over the feeder-belt 30. In practice the hopper H may be supplied with material by suitable means which directs the same to the belt 30, so that the latter on its movement may feed a stream to the bucket G, the receiving-orifice or supply-opening of which is located below the front end of the feeder and in alinement with the descending stream of material therefrom.

The feeder F will also have a variable or differential speed, whereby as the velocity thereof is varied the volume of the fed or forced stream will be correspondingly varied, and when said feeder is stopped the result naturally will be a stoppage of the fed or forced stream of material.

At the commencement of operation of the apparatus the feeder F will have its maximum or high velocity, so that it is effective for feeding a stream of relatively large volume, or what constitutes the main stream, into the bucket G. At the commencement of the poising period the speed of the feeder will be reduced, so that it may feed into the bucket a stream of relatively small volume, or what is usually termed the "drip-stream." On the completion of the bucket-load by the drip-stream the feeder movement will be instantly stopped, succeeding which the completed bucket-load will be discharged.

For controlling or regulating the movement of the feeder means operatively connected with some reciprocatory member of the weighing mechanism will be employed, said member being preferably operatively connected with the feeder, driving or actuating mechanism, whereby a reduction in speed and stoppage of the feeder may be automatically obtained at predetermined and proper points in the operation of the apparatus.

As a means for obtaining a differential speed of the feeder F, the driving mechanism herein illustrated will be preferably employed, and comprehends differential pulleys operatively connected by belting or analogous means with a second series of pulleys, which latter in turn may be connected by suitable gearing or otherwise to the feeder F.

A power or pulley-supporting shaft is shown at 35, and one of its ends will be preferably journaled in a bearing formed in the beam 6, the opposite end of said shaft being supported by a housing or journal-boxing $h$, which comprises two separable members $35'$ and $35''$, the last-mentioned of which is illustrated as formed integral with the beam 6. The two members of the shaft-housing $h$ will be suitably connected together in such a manner as to readily permit of their separation, whereby the shaft 35 may be dismounted for any purpose.

The shaft 35 is illustrated carrying adjacent to the rear end thereof the bevel-gear 36, which may be keyed or otherwise secured to said shaft for rotation therewith and which is shown meshing with a bevel-gear $36'$, suitably fixed upon the extended end of the roll-shaft 31, said gears being incased in the housing $h$, which constitutes a convenient means for preventing access of dust and other foreign matter to the teeth of said gears. On the rotation of the shaft 35 it will be evident that motion will be transmitted to the primary roll 31 of the feeder through the interposed bevel-gears 36 and $36'$, so that the feeder-belt 30 may be driven and a stream of material forced or fed from the chute or hopper into the bucket G. The shaft 35 is illustrated carrying a series of pulleys which are fast and loose thereon and which are also connected by belting or equivalent means with the hereinbefore-mentioned differential pulleys, said fast pulleys being splined or otherwise secured to the supporting-shaft 35 for rotative movement therewith.

In Figs. 3, 4, and 5 there is illustrated by dotted lines a line-shaft 37, which is shown suitably carrying the pulley $37'$, which is operatively connected by a belt with a suitable motor, (not shown,) or said shaft may be rotated by gearing. The shaft 37 is also illustrated supporting the differential pulleys 38 and $38'$, to which allusion has hereinbefore been made, the first-mentioned of which is of relatively larger diameter than the other, so that when effective it may drive the connected feeder F at a relatively high velocity, and when the pulley $38'$ is operative for actuating the said feeder the speed thereof, as will be readily obvious, is materially reduced.

The shaft 35 is illustrated carrying a series of fast and loose pulleys, the fast pulleys being designated by $f$ and $f'$ and the loose pulleys by $l$, $l'$, and $l''$, respectively, and which series is shown connected with the differential pulleys 38 and $38'$ by the two belts 39 and $39'$, which are laterally shiftable along said series of pulleys. The belt 39 is shown connected to the large pulley 38, the belt $39'$ being connected with the small pulley $38'$.

For moving the belts 39 and $39'$, respectively, a suitable shifting device, preferably operatively connected with some movably-supported member of the weighing mechanism, will be preferably employed, and for shipping said belts the T-shaped rod 40 is herein illustrated and is also shown pivotally supported at $40'$ by the framing of the apparatus.

The transverse portion or head $40''$ of the belt-shipping rod 40 is shown equipped with the usual belt-engaging fingers or members by which the two belts may be simultaneously moved along the series of fast and loose pulleys, so that at proper points in the operation of the machine the speed of the feeder may be automatically controlled and regulated by and from the weighing mechanism.

The peculiar operation of the feeder speed-changing and stopping means will be readily apparent from an inspection of the drawings. Fig. 3 illustrates the positions assumed by the operative parts of the apparatus at the commencement of a cycle of movements thereof, the feeder F being driven at its high speed, so that it is effective for feeding a stream of relatively large volume from the chute or hopper H into the bucket G. At this point the belt 39 will be on the pulley 38 and the fast pulley $f$, and the belt 39' will be on the small pulley 38' and the loose pulley $l'$, so that the shaft 37, through the two connected pulleys 38 and $f$, shaft 35, and bevel-gears 36 and 36', is operative for driving the feeder F. As the belt-shipper 40 is oscillated to what is herein illustrated as the "left," the two belts 39 and 39' will be simultaneously slipped from the pulleys $f$ and $l'$ to the pulleys $l$ and $f'$, respectively, so that the small pulley 38' is immediately effective for driving the connected feeder F at a decreased velocity. (See Fig. 4.) Though the pulley 38 continues to rotate, it is ineffective for operating the feeder F, as its belt 39 is on the loose or idle pulley $l$, which latter rotates ineffectively about the shaft 35.

The periphery of the pulley $l$ is shown as being relatively wide, the purpose of which will be now made apparent. As just stated, the feeder F is being driven at its low speed, which movement continues for a limited period of time, so that said feeder is operable during such reduced speed for supplying a stream of small volume into the bucket to complete the partial load therein. On the completion of the bucket-load the belt-shipping rod 40 is further oscillated to the left through its connection with the weighing mechanism, and the belt 39 is slipped thereby farther along the loose pulley $l$, and simultaneously therewith the belt 39 will be shifted to the loose or idle pulley $l''$, so that the feeder F may be instantly stopped, and through the shaft 37, pulleys 38 and 38', and the belt-connected pulleys $l$ and $l''$ continue their movements. The two said last-mentioned pulleys do not constitute a source of power for conveying motion to the feeder F, as they simply rotate about the supporting-shaft 35.

My present invention contemplates the employment of means for vibrating or jarring the feeder F during a portion of its operation and preferably during the poising or drip-stream period, so that when said feeder is running at a slow velocity and when thus vibrated the mass or supply of material sustained thereon will be thinned out and evenly distributed throughout the area of the feeder-belt 30.

As a means for imparting vibratory or rocking motion to the feeder F, the devices shown may be employed, which consist of a multifaced cam for imparting a movement in one direction to said feeder and a spring or spring-actuating device for effecting the opposite movement thereof.

The yoke 33, which has been described as constituting a means for supporting in part the feeder or conveyer belt 30, is also vibratory, and it will be evident that on the vibration thereof such motion will be transmitted to the feeder F for effecting the peculiar results hereinbefore mentioned.

The yoke 33 is shown having formed at one side of the axis of movement or pivot 34 the laterally-extending arm 41, provided at the outer end thereof with an antifriction-roll 41', which serves its well-known office and which is interposable into the path of movement of the multifaced cam 42, suitably secured to the shaft 35 for rotation therewith. The yoke 33 is also shown having a second laterally-extending arm 43, formed on the opposite side of its axis of movement, to which and to the under side of the top beam 5 a coiled spring 44 is shown attached. The spring 44 forces the antifriction-roll 41 against the faces of the cam-wheel 42, so that as the latter rotates the faces thereof may successively rock the yoke 33 in one direction, the coiled spring 44 oppositely rocking the said yoke, the vibrations of the latter being imparted to the conveyer-belt 30.

During the major period of the operation of the apparatus, or while the stream of large volume is fed into the bucket, the feeder-vibrating means will be held inactive and preferably by means governed from the weighing mechanism, whereby an automatic operation may be obtained.

The top beam of the framing is illustrated pivotally carrying the link 45, which is also operatively connected with some member of the weighing mechanism. Said link is shown having the inward projection 45'. (Herein illustrated as an antifriction-roll.) As the link 45 swings in one direction the projection 45' thereon moves under the lateral arm 43, raising said arm and the right-hand side of the yoke 33, depressing the opposite side of said yoke and also the roll 41, so that this will be carried past the plane of movement of the multifaced cam 42, the latter thereby being rendered ineffective as a stroke-transmitting factor and the feeder F held non-vibratory. (See Figs. 3 and 6.)

At a predetermined point in the operation of the apparatus or at the commencement of flow of the drip-stream the projection 45' is swung from under the arm 43 and to what is illustrated as the "right" in Fig. 6, so that the coiled spring 44 and multifaced cam 42 become immediately operative for transversely vibrating or reciprocating the feeder F. On the stoppage of the shaft 35 by the shipping of the belts 39 and 39' in the manner previously described the vibratory movement of the feeder F will be concurrently stopped, as will be clearly obvious.

The invention also comprehends a disintegrating device disposed in the line of flow of the supply-stream and preferably supported for yielding movement and in a direction coinciding with the direction of flow of said stream. The disintegrating device (illustrated in its preferred form in Fig. 1) consists of a shaft 47, the opposite ends of which are journaled in a suitable bearing formed in the top frame of the apparatus, and a series of radial bars or fingers extending therefrom and properly spaced, said bars being designated by 47' and being preferably integral with the shaft 47. The shaft 47 will be also preferably counterweighted, a weight 48, formed at one end of the arm 48', being provided for this purpose, so that the fingers or bars 47 will be held in contact with the fed stream of material on the conveyer or feeder belt 30. Should there be any lumps in the mass on said belt these will be effectively broken as they strike the bars or fingers, and for securing a greater range of action of the disintegrating device the shaft 47 will be positioned for receiving a reciprocatory movement from a suitable device.

The shaft 47 is illustrated carrying a peripherally-grooved clutch member 49, between the walls of which a suitable pin or like device formed on or carried by the rock-arm 50 is operative, the opposite end of said rock-arm being suitably fixed to the relatively short rock-shaft 51, which also fixedly carries the bifurcated or forked transmission device 52, between the branches of which the cam or eccentric 58, formed on or secured to the shaft 35, is rotative, so that on the rotation of said shaft a reciprocatory movement will be conveyed to the rock-arm 50 by the interposed cam 58 and transmission device 52 for reciprocating said rock-arm and also the connected shaft 47.

It frequently happens that particles of material cling or stick to the feeder or conveyer-belt 30 when this is on its lower run, and becoming dislodged therefrom are, of course, wasted. For catching such separated particles to prevent the waste thereof a shaking or reciprocatory apron is shown located below the feed-belt 30 and is preferably disposed at such an inclination as to freely permit the dislodgment of any of the material thereon on its reciprocation. Said shaking-apron is designated by 53 and preferably has upturned ends or flanges to prevent lateral scattering of any material that may drop thereon from the feeder. The apron 53 is shown supported adjacent to its front end by the two links 53' and 53'', which are shown pivotally connected thereto at opposite ends and also to the top framing or beams 5 and 6.

The two standards 8 and 9 are illustrated supporting the rock-shaft 54, to one end of which is fixed the rock-arm 55, the opposite end of the latter being shown pivotally connected with the shaking-apron 53. The opposite end of the shaft 54 is shown equipped with an angle-lever 56, one member or arm of which is pivotally connected with the apron 53, and the other arm of which is shown similarly connected to the pitman 57, which latter has a ring 57' at its upper end, which embraces the cam or eccentric 58', suitably formed on or carried by the extended end of the roll-supporting shaft 31', so that on the movement or rotation of said shaft a reciprocatory movement will be imparted to the operatively-connected apron in an obvious manner, and on the stoppage of said shaft 31' the shaking-apron will be simultaneously stopped.

On the completion of the bucket-load the feeder F is instantly stopped, and when such action takes place the material lying thereon near the front thereof is usually projected toward the bucket. While this dislodged mass is quite small it is desirable that it should not enter the loaded bucket, the result being, as will be understood, an error in weighing. For catching such dislodged particles of material a valve 70 is herein illustrated, which during the normal or major part of the operation of the machine is not in contact with said stream, so that it may flow without obstruction into the bucket.

The valve 70 is of the "pan" or "scoop" type, and for supporting the same the following means may be employed: The beams 5 and 6 of the apparatus are illustrated having formed thereon the arms or brackets 5'' and 6', between and to which the rock-shaft 59 is shown pivotally supported. The rock-shaft 59 is also shown having adjacent to its opposite ends the rock-arms 59' and 59'', between which the valve 70 is hung, the support for said valve being suitable pivot-screws carried by said rock-arm and journaled in the opposite end walls of said valve.

The drizzle catching or closing movement of the valve may be effected by the following mechanism: The side frame 4 is illustrated pivotally carrying a lever 504, the rear or long arm of which is shown provided with a counterweight 507, preferably adjustable along said arm, and said counterweighted arm normally exerts a valve-closing tendency or moves downward. This action, however, will preferably be prevented during the major period of the operation of the apparatus, so that the valve 70 will be held away from the line of flow of the stream fed into the bucket G by the belt 30.

The hub 504'' of the lever 504 (see Fig. 1) is illustrated carrying the rigidly-connected rock-arm 60, the opposite or upper end of which is shown pivotally connected with the hub or extension 60', projecting from the valve 70 at a point to its rear and above the axis of movement of said valve in its hereinbefore-described supporting frame or yoke.

It is to be understood that when the descending movement of the lever 504 is herein mentioned such statement refers to the movement of the long or counterweighted arm of said lever.

It will be remembered that a belt-shipper 40 has been hereinbefore described and as also connected with a reciprocally-supported member of the weighing mechanism for effecting a shifting of the belts 39 and 39', whereby the speed of the feeder and its stoppage may be automatically controlled, and such reciprocatory member is herein illustrated as the lever 504. Said lever is shown having formed at a point adjacent to its center of movement the upwardly-extending lug or ear 61', to which is illustrated as pivotally connected the link 61, the opposite end of which latter is shown as similarly connected with the belt-shipping rod 40 at a point preferably intermediate its ends.

The lever 504 on its descending movement or stroke will have two successive periods of operation, at the commencement of the first-mentioned of which, or when the feeder F is driven at its low speed, it may be intersected by suitable automatically-operating means, whereby the duration of feed of the drip-stream may be controlled. The operation of the lever 504 will be clearly understood from a reference to Figs. 3, 4, and 5 of the drawings, which illustrate the successive positions occupied thereby during its cycle of movement. Fig. 3 illustrates the lever 504 in its uppermost position, the belt 39 being on the large pulley 38 and the fast pulley $f$, the companion belt 39' being on the loose pulley $l'$, the pulley 38 being operable for driving the connected feeder F at its high speed.

As the lever 504 descends from its uppermost position, the belt-shipping device 40 will be oscillated to what is herein illustrated as the left and in unison therewith through the intervention of the link 61, which is connected, respectively, with said belt-shipping device 40 and lever 504. While this action is taking place the two belts 39 and 39' will be slowly moved to the left and slipped along their supporting-pulleys, so that at a predetermined point in the operation of the machine, or when the bucket has nearly completed its load, the belt 39 will have been shifted to the loose pulley $l$ and the belt 39' to the fast pulley $f'$, as indicated in Fig. 4, whereby the small pulley 38 is effective for driving the connected feeder F through the medium of the fast pulley $f'$, which is connected with said feeder. At this point in the operation of the apparatus the lever 504 will be held against further descending movement to permit the flow of a drip-stream into the nearly-loaded bucket, and when released will have a further descending movement, during which the two belts 39 and 39' will be further shifted by the device 40, the belt 39 being slid further along the relatively wide loose pulley $l$ and the belt 39' to the loose pulley $l''$, so that the movement of the feeder F will be instantly stopped, the pulleys $l$ and $l''$, rotating idly about their supporting-shafts 35, being then ineffective as power-transmitting factors. On the ascending movement of the lever 504 the operation just described will be reversed.

During the descending movement of the valve-actuating lever 504 it is operable for closing the valve, which latter, during the flow of the main or relatively large stream, is located relatively remote from said stream as it leaves the feeder F and descends toward the bucket G.

As the lever 504 descends, a force will be exerted thereby through the rock-arm 60 to the rock-arm 59'', its shaft 59, and the complementary rock-arm 59' through the interposed valve 70, the force being directed against the point of pivotal connection of the rock-arms 59' and 59'' with the valve, so that said rock-arm will be moved to what is herein illustrated as the left, this action continuing during the flow of the main stream, or up to the point indicated in Fig. 4. At this point in the operation of the apparatus the lever 504 is held against further descending movement, and during the first-mentioned movement of said lever the oscillation of the valve 70 about its own axis is quite slight. On the release of the lever 504 it descends farther and is operable for further oscillating the rock-shaft 59 and the two rock-arms 59' and 59'' and also imparting to the valve 70 a relatively considerable upward oscillation, so that it may catch the drizzle or spray which drops from the feeder F on its stoppage, this action taking place on the last-mentioned movement of the lever 504, or when it drops from the position indicated in Fig. 4 to that illustrated in Fig. 5. On the ascending movement of the lever the described operation will be reversed.

It is desirable to check or retard the descending movement of the lever 504, whereby the closing movement of the valve 70 and the shipment of the belts 39 and 39' may be regulated with precision. For effecting this action the oscillatory cam 500 is illustrated having two cam-faces 501 and 502, the last-mentioned of which is of relatively less retarding efficiency than the former.

The short arm of the lever 504 is illustrated equipped with an antifriction-roll 506, which is adapted to successively contact with the two connected cam-faces 501 and 502, so that as said roll is on the cam-face 501 a slow downward movement of the lever 504 will be the result, and when the roll 506 leaves said cam-face and engages the cam-face 502 an accelerated or multiplied downward movement of said lever will follow, and said lever during said last-mentioned movement is operable for stopping the feeder F and for imparting the final closing movement to the valve 70, with which it is respectively connected.

As a means for supporting the cam 500 a transverse rock-shaft 63 is illustrated pivotally supported to and between the brackets or arms 5''' and 6''', projecting forward from the top beams 5 and 6, respectively, of the framing, said cam being preferably formed integral with the hub 63'.

The opposite hub 63'' of the rock-shaft 63 is illustrated having formed thereon a lug or ear to which is pivotally attached the connecting-rod 558, constituting a thrust-rod, which also has ascending and descending movements, for a purpose to be hereinafter described, the guide or link 558', attached to said rod and also to a relatively fixed part of the framing, constituting a convenient means for maintaining said rod in its operative position. Said rod 558 serves a dual function—as a means for transmitting a thrust to the valve 70 sufficient for opening the same and also as a means, in connection with some suitable member, for limiting the oscillatory movement of the cam 500, these two members, as has been described, being connected to the rock-shaft 63.

It will be remembered that the normal tendency of the lever 504 is to descend to accomplish the peculiar results hereinbefore specified and that the cam 500 constitutes a convenient stop device for checking such movement.

The scale-beam B is illustrated shiftably supporting the counterweighted lever 551, pivoted thereto adjacent to its inner end, the weight of which is normally exerted on the counterpoised side of said scale-beam, but which, when shifted at a predetermined point in the operation of the apparatus, will be subtracted from said counterweighted side of the scale-beam B. The normal position of the counterweighted lever 551 is illustrated in Fig. 6, said lever being maintained in such position by suitable stops, so that it constitutes during the greater part of the operation of the apparatus an extension of the beam B.

As the bucket and beam mechanism descend, due to the flow of the stream into said bucket, the lever 551 will move with the beam B, and, falling from under the connecting-rod 558, the shaft 63, and hence the connected cam 500, may be rocked, the movement of the cam being, as hereinbefore specified, to the left, the antifriction-roll 506 riding along the cam-face 501, thereby permitting a slow descending movement of the lever 504. When the roll has reached the intersection of the connected cam-faces 501 and 502, its further movement will be suitably intercepted, and when said lever is released the roll 506, leaving the cam-face 501, will engage the cam-face 502. The result will be an accelerated downward movement of the lever 504.

It will be assumed that the lever 551 has been shifted about its pivot on the beam B and is free to return to its normal position, (illustrated in Fig. 6,) the cam 500 and lever 504 being in the positions illustrated in Fig. 5. As the lever 551 resumes its normal position an upward thrust will be imparted to the connecting-rod 558 and an oscillatory movement transmitted to the connected cam, and its movement to what is herein illustrated as the "right" in said Fig. 5 will be effected, so that said cam, as its faces 502 and 501 respectively engage the roll 506, is operable for returning the lever 504 to its uppermost position, as will be clearly obvious.

As a means for intercepting the downward movement of the lever 504 at a predetermined point in the operation of the apparatus or when the two belts 39 and 39' have been shipped from the pulleys $f$ and $l'$ to the pulleys $l$ and $f'$ to effect the low speed of the feeder F, the following instrumentalities may be employed: The hub 63' of the rock-shaft 63 is illustrated carrying the depending rod 569, the path of movement of which is intersected by a suitable stop. The stop-rod 569 being oscillatory with the shaft 63, which shaft also rigidly carries the cam 500, it will be apparent that when said rod is held against movement the oscillatory movement of the cam 500 by the lever 504 will be likewise prevented. The stop for thus engaging the rod 569 is illustrated as a counterweighted lever 575 pivotally supported upon the scale-beam B (see Figs. 3, 4, and 5) and which is adapted for engaging the rod 569 at a predetermined point in its oscillatory movement, whereby the connected cam 500 and lever 504 may be also held against movement, as shown in Fig. 4. At this time the drip-stream will flow into the bucket to complete the load therein, and when the load is completed and the bucket and beam mechanism are caused thereby to descend below the poising-line the by-pass 570 will release the rod 569 and the devices controlled thereby. Suitable means will also be employed for maintaining the by-pass 570 against reverse movement when in engagement with the rod 569. On the return movement of said rod 569 it simply engages and swings the by-pass 570 ineffectively about its pivot.

The apparatus involves the provision of reciprocally-effective stop devices operative, respectively, with the valve, and hence with the feeder and with the bucket-closer, so that the valve 70 will be maintained positively in a closed position and the feeder at rest while the closer is open, and the closer will be likewise held against opening movement while the valve is open and the feeder in motion, should the latch 82 be prematurely tipped.

The closer-operative stop is herein illustrated as the rocker 550, the coacting stop, or that operative with the valve 70 and feeder F, being designated by 412. The rocking stop 550 is also illustrated having two supplemental stops or stop-faces 413 and 413', the first mentioned of which is defined by an arc struck from the axis of movement of the said stop 550. The stop 412 is illustrated rigidly connected with the rock-shaft 63, being preferably formed integral with the shaft-hub 63'', and it will be evident that any limitation in movement of the stop 412 will similarly affect the rock-shaft 63, and hence the cam 500, and necessarily the feeder F, through the lever 504, which controls the action of said feeder. The stop 412 is shown having two supplemental stops or stop-faces 412' and 412'', the first mentioned of which is a curved stop-face concentric with the axis of movement of said stop, and the other of which is a suitably-supported antifriction-roll.

The operation of the stop system will be understood from an examination of the drawings. So long as the stops 413' and 412' are in contact, as indicated in Fig. 6, the oscillation of the stop 550 will be prevented, the opening movement of the closer being likewise prevented, the stop 412 serving, while this contact continues, practically as a fixed abutment. As the cam 500 moves to what is indicated as the left in Fig. 3 and the speed of the feeder is varied in the manner previously described the stop 412 will move in unison and in a direction coincident therewith, or to what is illustrated as the right in Fig. 6.

When the stop or roll 412″ has crossed the plane of curvature of the stop-face 413, which action takes place during the final descending movement of the lever 504, or when it drops from the position shown in Fig. 4 to that illustrated in Fig. 5, the stop 550 is free to oscillate to permit the discharge of the bucket-load, it being understood that when the rocker or stop 550 is released from all restraint the connected bucket-closer L may be forced open by the weight of the bucket contents. As the stop 550 oscillates its stop-face 413 will run in contact, or approximately in contact, with the stop or roll 412″, so that any tendency of the connected stop device 412 to reversely oscillate will be effectually resisted by the stop 550. This being the case, the valve 70 will be maintained in its closed position by the cam-face 502, which engages the roll 506 of the lever 504, these last-mentioned parts being then in the position indicated in Fig. 5, the two belts which are operated by said lever 504 being on the two loose pulleys $l$ and $l''$, and the feeder F being at rest. This peculiar relation will continue so long as the stops 413 and 412″ are in contact.

It will be remembered that means have been described for vibrating the feeder F transversely thereof, this action taking place during a portion of its movement, or, as herein illustrated, during the drip period, during which time the feeder F is operable for feeding a stream of small volume into the bucket G, it being driven at its low speed. For holding the feeder-vibrating means inoperative during the flow of the main stream, a connecting-link 45, having a projection 45′, has been hereinbefore described, said link 45 being also operatively connected with some movable member of the weighing mechanism, which is herein shown as the stop 412, the link 65, pivotally connected at its opposite ends to said stop and to the link 45, serving this purpose. On the opening movement of the valve 70 the stop member 412 will oscillate to the left, it being illustrated in Fig. 6 as having reached the limit of its forward movement; and at a predetermined point in said movement the projection 45′ will engage under the laterally-projecting arm 43 of the roll-supporting yoke 33, raising the right-hand end of said yoke and depressing the opposite end thereof, whereby the laterally-projecting arm 41 or the friction-roll 41′ thereon is carried past by the path of movement of the multifaced cam 42, and the latter thereby rendered ineffective as a means for vibrating the yoke 33.

On the movement of the stop 412 to the right, as indicated in Fig. 6, the link 45 will be moved in correspondence therewith and thereby, so that the projection 45′ will be disengaged from the laterally-extending arm 43 of the rocking yoke 33, whereby the latter may be oppositely rocked by the multifaced cam 42 and the spring 44 in the manner previously described.

It will be remembered that the latch 82 has been described as normally operative for maintaining the rocker 550, and hence the connected closer against opening movement by engaging a detent formed on the rocker-arm 550′, and that said latch is depressible for releasing said rocker and closer.

The latch 82 is shown equipped with the laterally-projecting pin 82′, which is disposed in the path of movement of the projection 88, suitably formed on the thrust-rod 558, which projection is operable for engaging the latch-pin 82′ and depressing said latch at a proper point in the descending movement of said rod 558.

In Figs. 7 and 8 a modification of the disintegrating device for breaking up the lumps in the flowing stream is illustrated, said device being the same in construction and mode of operation as that illustrated in Fig. 1, except that the supporting-shaft 67 is rotatively supported in the brackets 67″, and the bars or spokes 68, which radiate therefrom, are disposed spirally on a line running from end to end of the supporting-shaft 67.

The operation of the hereinbefore-described apparatus is as follows: Figs. 1 and 3 illustrate the positions occupied by the respective operative parts of the apparatus at the commencement of operation thereof, the feeder F being driven at its high or maximum speed whereby it is adapted for feeding a stream of relatively large volume into the bucket G. When a certain proportion of the load has been received by the bucket, this and the beam mechanism will descend. As the beam mechanism descends the counter-weighted lever 551 will descend with the scale-beam B and fall from under the lever 558 and permit its descending movement and the closure of the valve 70 by the descending lever 504. As the lever 504 descends it moves the belt-shipping device 40 to the left, the latter slipping the belts 39 and 39′ from the pulleys $f'$ and $l'$ to the pulleys $l$ and $f$, which position is illustrated in Fig. 4, the small pulley 38′ being operative for rotating the shaft 35 at a relatively slow speed, and hence also correspondingly decreasing the speed of the feeder F through the bevel-gears 36 and 36′, the last-mentioned of which is connected to the roll-shaft 31. At or about the close of this stage of the operation of the apparatus the stop-rod 569 will have been carried against the by-pass stop 570 on the scale-beam B, whereby the further progress of said rod and the cam 500, which is rigidly connected with supporting-lever 63 of the rod 569, is prevented, as shown in Fig. 4, so that while this relation continues the lever 504 will be maintained against further descending movement. While the belts 39 and 39' are on the two pulleys $l$ and $f'$, respectively, the feeder F will be driven at a low speed, so that it is operable for supplying a stream of small volume to the bucket G, the pulley $l$ rotating idly about its supporting-shaft 35. The drip or reduced stream will then flow into the bucket to complete the load therein, the nearly-loaded bucket in the meantime descending, the beam mechanism of course descending in unison therewith. When the by-pass 570 has released the stop-rod 569—due to the descent of the beam B below the poising-line, indicating the completion of the bucket-load—said stop-rod is free to further oscillate. When the stop-rod 569 is held against movement, the cam 500, and hence the lever 504, engaged thereby and the connecting-rod 558, are held; the counterweighted lever 551 falling from under the connecting-rod 558. On the release of the stop-rod 569, as just described, it may oscillate from the position illustrated in Fig. 4 to that shown in Fig. 5, the cam 500 being also released and an accelerated downward movement of the lever 504, caused by the roll 506 riding along the cam-face 502. During the final descending movement of the lever 504 it moves the belt-shipping device 40 to the left, so that said device shifts the belt 39 farther along the loose pulley $l$ and the belt 39' to the loose pulley $l''$, whereby these become ineffective as means for transmitting motion to the connected feeder F. During this last-mentioned movement of the lever 504 the rod 558 will be thrust downward with its projection 88 into contact with the latch-pin 82', which action trips the latch 82 and releases the bucket-closer L, so that the weight of the bucket contents may force the same open.

Having described my invention I claim—

1. The combination with weighing mechanism embodying a reciprocatory member; of a feeder; suitably-supported fast and loose pulleys, the latter of which is operatively connected with the feeder; a belt; and means operatively connected with said reciprocatory member for shipping said belt from one of said pulleys to the other.

2. The combination with weighing mechanism embodying a reciprocatory member; of a feeder; a shaft having differential pulleys; a second shaft operatively connected with said feeder and supporting a series of fast and loose pulleys; belting connecting said differential pulleys with said series of fast and loose pulleys; and a belt-shifting device operatively connected with said reciprocatory member.

3. The combination with weighing mechanism embodying a counterweighted lever and automatically-operating means for controlling the movements of said lever; of a feeder; suitably-supported fast and loose pulleys; a belt; and means operatively connected with said lever for shipping said belt from one of said pulleys to the other, and vice versa.

4. The combination with weighing mechanism embodying a valve; of a feeder; a shaft operatively connected to said feeder and supporting fast and loose pulleys; a belt; a valve-actuating device; and means operatively connected with said valve-actuating device for shipping said belt from one of said rolls to the other, and vice versa.

5. The combination with weighing mechanism embodying a reciprocatory member; of a feeder; a shaft operatively connected to said feeder and supporting fast and loose pulleys; a belt; a suitably-supported belt-shipping device; and a link operatively connecting said belt-shipping device and reciprocatory member.

6. The combination with weighing mechanism, of a power-driven, transversely-vibratory feeder controlled by said weighing mechanism.

7. The combination with a power-driven feeder, of means for vibrating the same during a portion of its movement.

8. The combination with a power-driven feeder having high and low speeds, of means for vibrating said feeder during its low speed.

9. The combination with a feeder consisting of a belt, of a pair of rolls for supporting said belt; and a movably-supported yoke for supporting one of said rolls.

10. The combination with a feeder consisting of a belt, of two rolls for supporting said belt; a rocking yoke supporting one of said rolls; and means for vibrating said yoke.

11. The combination with a suitable frame having a bearing, of a yoke having a journal located in said bearing; a roll; a second roll; a belt connecting said rolls; and means for vibrating said yoke.

12. The combination with a suitably-supported yoke, of a pair of belt-connected rolls, one of which is supported by said yoke, and the other of which is connected with suitable driving mechanism; and means for varying the speed of one of said rolls.

13. The combination with a variable-speed feeder and its driving mechanism, of means for vibrating said feeder.

14. The combination with weighing mechanism embodying a reciprocatory member; of a feeder; a shaft operatively connected with said feeder and supporting fast and loose pulleys; a belt; and means operatively connected with said reciprocatory member for shipping said belt from one of said pulleys to the other, and vice versa; and means for vibrating said feeder.

15. The combination with a suitably-supported yoke having laterally-extending arms; of two rolls connected by a belt, one of which is supported by said yoke and the other of which is operatively connected with driving mechanisms; and means for engaging said lateral arms to thereby oppositely rock said yoke.

16. The combination with a suitably-supported yoke having laterally-extending arms; of two belt-connected rolls, one of which is supported by said yoke; a multifaced cam for engaging one of said lateral arms; and a spring connected with the other arm and with a relatively-fixed part of the framing.

17. The combination with weighing mechanism embodying a bucket, of a feeder; a disintegrator; actuating mechanism for said feeder and disintegrator; and means controlled by the weighing mechanism, for reciprocating said disintegrator transversely of the line of feed of a stream of material supplied by said feeder.

18. The combination with a feeder operable for supplying a stream of material, and driving mechanism for said feeder; of a shaft having a series of fingers projecting therefrom and provided with means for holding said fingers in contact with said stream of material; and weighing mechanism automatically controlling the action of said feeder.

19. The combination with a pair of rolls, of an endless belt connecting said rolls; a shaft having a series of bars projecting therefrom and located above the upper run of said feed-belt; means for reciprocating said shaft transversely of the line of feed of a mass of material on said feed-belt; and driving mechanism for one of said rolls.

20. The combination with weighing mechanism embodying a reciprocatory member; of a feeder; a shaft operatively connected to said feeder and supporting fast and loose pulleys; a belt; a suitably-supported belt-shipping device; means operatively connecting said belt-shipping device and reciprocatory member; and a suitably-supported shaft having a series of fingers projecting therefrom.

21. The combination with a feeder having a variable speed, and operable for supplying a stream of material; a suitably-supported shaft having a series of fingers adapted to contact with said stream of material and automatically-operative means for regulating the speed of said feeder.

22. The combination with weighing mechanism embodying a bucket, of a variable-speed power-driven feeder controlled by the weighing mechanism; and a reciprocating apron located below said feeder.

23. The combination with weighing mechanism embodying a bucket, of a variable-speed power-driven feeder controlled by the weighing mechanism; a supporting-shaft provided with an eccentric; a suitably-supported reciprocating apron operative beneath said feeder; and a pitman operatively connected to said eccentric and reciprocating apron.

24. The combination with a framework, of a rock-shaft supported thereby and having rock-arms; a valve supported between said rock-arms; and valve-actuating mechanism.

25. The combination with framework, of a rock-shaft supported thereby and having rock-arms; a valve pivotally supported between said rock-arms; and valve-actuating mechanism.

26. The combination with framework, of a rock-shaft supported thereby and having rock-arms; and a lever operatively connected with said valve.

27. The combination with framework, of a rock-shaft supported thereby and having rock-arms; a valve pivoted between said rock-arms; a pivotally-supported lever having a rock-arm movable about the axis of said lever and connected thereto and also to said valve.

28. The combination with framework, of a rock-shaft supported thereby and having rock-arms; a valve pivotally supported by said rock-arms; an independent shaft carrying a cam; and a lever in engagement with said cam and operatively connected with said valve.

29. The combination with framework, of a rock-shaft supported thereby and having rock-arms; a valve pivotally supported by said rock-arms; an independent shaft carrying a cam; a lever in engagement with said cam and operatively connected with said valve; and means for limiting the movement of said last-mentioned rock-shaft.

30. The combination with framework, of a rock-shaft supported thereby and having rock-arms, a valve pivotally supported between said rock-arms; an independent shaft provided with a cam; a lever in engagement with said cam and operatively connected with said valve; a rod supported by said last-mentioned shaft; and a stop for engaging the same at a predetermined point in the operation.

31. The combination with a feeder and driving mechanism therefor, of a valve; valve-actuating mechanism; a bucket having a closer; and means for maintaining the valve closed and the feeder at rest while the closer is open.

32. The combination with a feeder and its driving mechanism, of a valve; valve-actuating mechanism; a bucket having a closer; and reciprocally-effective stops operative, respectively, with said valve and closer.

33. The combination with a feeder having a variable speed and also a period of rest, of a bucket having a closer; and reciprocally-effective stops operative for maintaining the feeder at rest while the closer is open, and for holding the closer against opening movement while the feeder is in motion.

34. The combination with framework, of a rock-shaft supported thereby and having rock-arms; a valve supported between said rock-arms; a bucket having a closer and reciprocally-effective stops connecting, respectively, with said valve and closer.

35. The combination with framework, of a rock-shaft supported thereby and having rock-arms; a valve supported by said rock-arms; an independent shaft carrying a cam; a lever in engagement with said cam and operatively connected with said valve; a stop also carried by said last-mentioned shaft; and a coacting stop operatively connected with said closer.

36. The combination with framework, of a rock-shaft supported thereby and having rock-arms; a valve supported by said rock-arms; an independent shaft provided with a connecting-rod; a cam carried by said independent shaft; a lever in engagement with said cam and operatively connected with said valve; and a device for engaging said rod.

37. The combination with framework, of a rock-shaft having rock-arms and having said rock-shaft supported by said framework; a valve supported between said rock-arms; an independent shaft; an independent shaft having a depending stop-rod; a stop for engaging the same; a cam on said independent shaft; a lever in engagement with said cam and operatively connected with said valve; a bucket having a closer; a stop supported by said independent shaft; a coacting stop operatively connected with said closer; a connecting-rod attached to said independent shaft; and a device for engaging said connecting-rod.

38. The combination with a bucket, of a closer therefor consisting of two connected plates, one of which is attached to the bucket; and closer-supporting means connected to the other plate.

39. The combination with a bucket, of a closer therefor consisting of two connected plates, one of which is attached to the bucket; and closer-supporting means connected to the other plate.

40. The combination with bucket mechanism embodying a shiftable load-discharge member, of a variable-speed feeder having also a period of rest; and means operative with said shiftable load-discharge member for holding said feeder against movement during the load-discharge period.

41. The combination with a bucket, of a two-part closer therefor; a counterweighted lever; and a link connecting said lever and closer.

42. The combination with a bucket, of a closer therefor consisting of two pivotally-connected plates, one of which is provided with a stop for impinging against the other on the opening movement of said closer; a counterweighted lever; and a link connecting said lever and one of the closer-plates.

43. The combination with weighing mechanism, of a feeder; a shaft operatively connected to said feeder and having fast and loose pulleys thereon; a belt; a belt-shipping device; and means operative with said weighing mechanism for limiting the movement of said belt-shipping device.

44. The combination with weighing mechanism embodying a bucket having a member shiftable for discharging a load, of a power-driven feeder having a variable speed; a disintegrating device; a valve; valve-actuating mechanism; and means operative with said weighing mechanism for throwing said feeder and disintegrator out of action on the completion of a bucket-load.

45. The combination with a feeder comprising a roll; a yoke supporting said roll and having a lateral arm; a shaft having a series of fast and loose pulleys; a series of differential pulleys; belting connecting said series of pulleys; a belt-shipping device; and a multifaced cam supported by said shaft and operable for engaging said lateral arm.

46. The combination with a feeder; of a shaft carrying a series of fast and loose pulleys; a belt-shipping device; a suitably-supported rock-shaft having rock-arms; a valve supported between said rock-arms; a valve-actuating lever; and connections between said valve-actuating lever and valve.

FRANCIS H. RICHARDS.

Witnesses:
 FRED. J. DOLE,
 HENRY BISSELL.